United States Patent [19]
Caruso

[11] 4,094,075
[45] June 13, 1978

[54] SYSTEMS FOR DRYING PARTICULATE MATERIAL

[76] Inventor: Peter M. Caruso, 558 Cherry St., Galesburg, Ill. 61401

[21] Appl. No.: 779,868

[22] Filed: Mar. 21, 1977

[51] Int. Cl.² ............................................. F26B 21/06
[52] U.S. Cl. ............................................ 34/72; 34/73; 34/165
[58] Field of Search ............... 34/57 C, 72, 73, 77, 34/78, 165, 169, 175, 177; 165/61

[56] References Cited

U.S. PATENT DOCUMENTS

| | | | |
|---|---|---|---|
| 1,761,016 | 6/1930 | Koehring et al. | 34/25 |
| 2,641,849 | 6/1953 | Lintz | 34/57 C |
| 2,671,968 | 3/1954 | Criner | 34/33 |
| 2,795,056 | 6/1957 | Remer | 34/85 |
| 3,572,427 | 3/1971 | Buffington | 34/73 X |
| 3,762,065 | 10/1973 | Wahlgren | 34/73 |
| 3,931,683 | 1/1976 | Crites et al. | 34/73 X |

*Primary Examiner*—Edgar W. Geoghegan
*Attorney, Agent, or Firm*—Bernard L. Kleinke

[57] ABSTRACT

Systems for drying moisture entrained particulate material include a pressurizable chamber for receiving the material to be dried, and a fluid bed device disposed within the chamber for moving the material from an inlet through the chamber to an outlet. A heat exchanger heats the material to be dried flowing into the chamber. Compressing apparatus in the form of a blower pump draws air from the chamber to remove moisture from the material and for compressing the moisture entrained air for heating it. The heated moisture entrained air is guided from the compressing device to the heat exchanger for supplying heat to it. In one form of the invention, a second heat exchanger disposed near the oulet of the chamber cools the material prior to its leaving the chamber for retaining heat within the system. The air flowing from the second heat exchanger is heated by conduction from the blower pump prior to entering the pressurizable chamber for an even more efficient operation of the system.

10 Claims, 5 Drawing Figures

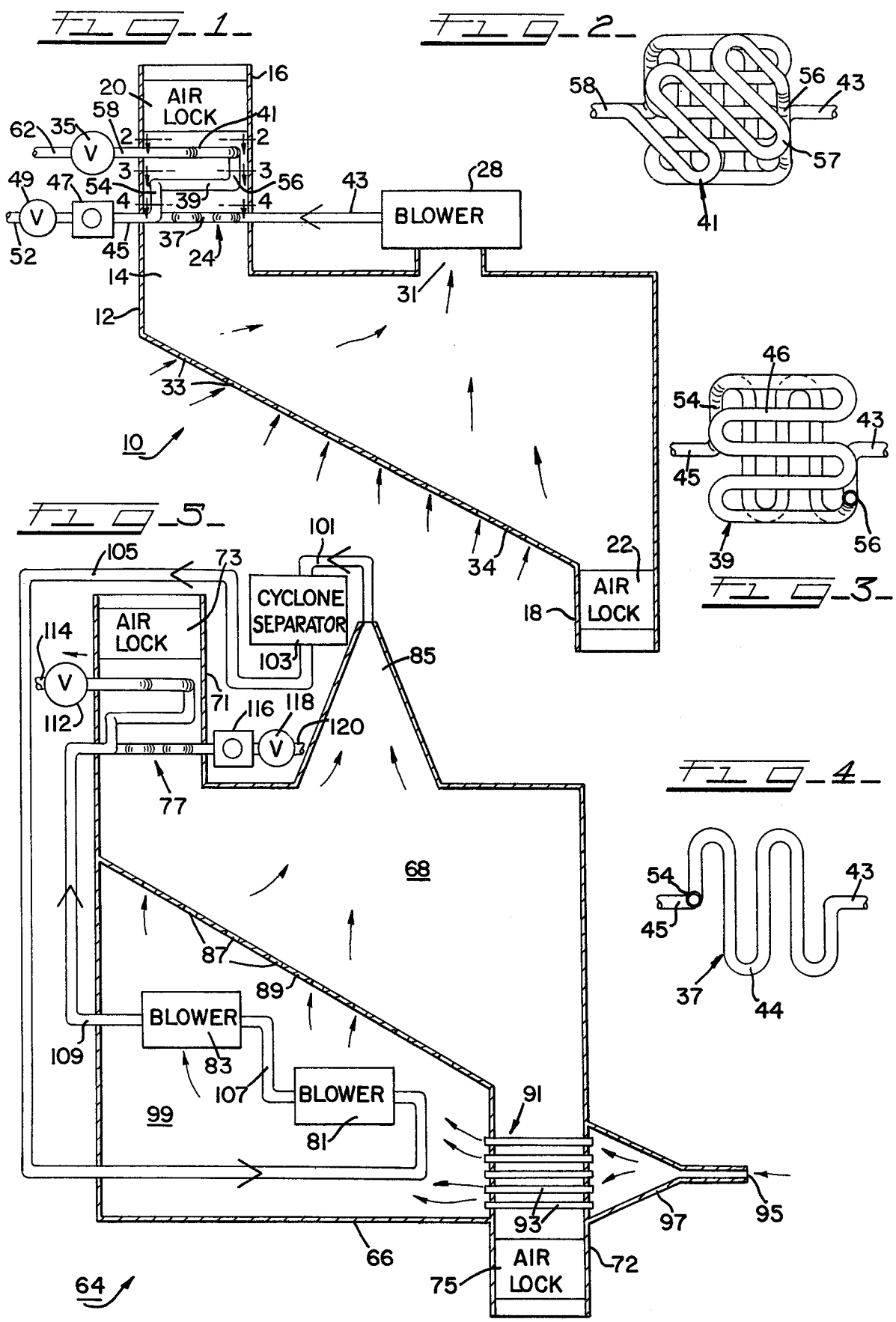

SYSTEMS FOR DRYING PARTICULATE MATERIAL

The present invention relates in general to systems for drying moisture-entrained particulate material, and it more particularly relates to such a particulate drying system which enables particulate material, such as sand and grains to be dried in a highly efficient manner.

Many different types and kinds of particulate drying systems have been known in the past. For example, reference may be made to the following U.S. Pat. Nos. 1,761,016; 2,641,849; 2,671,968; 2,795,056; 3,572,427; 3,762,065 and 3,931,683. In all of these systems, while they may be satisfactory for some applications, it would be highly desirable to have a particulate drying system which removes moisture entrained in the material to be dried so that a greatly reduced amount of energy is required to operate the system and a much smaller amount of pollutants are introduced to the ambient air. Such a drying system should be relatively inexpensive to manufacture and should be convenient to use.

Therefore, the principal object of the present invention is to provide new and improved particulate drying systems, which are highly efficient in operation and which are relatively inexpensive to manufacture.

Another object of the present invention is to provide such particulate drying systems, which require less energy to operate, and which introduce less pollutants to the ambient air.

Briefly, the above and further objects of the present invention are realized by providing systems for drying moisture-entrained particulate material, such systems include a pressurizable chamber for receiving the material to be dried, and a fluid bed disposed within the chamber for moving the material from an inlet through the chamber to an outlet. A heat exchanger heats the material to be dried flowing into the chamber, and a compressing means in the form of a blower pump draws air through the chamber to remove moisture from the material and compresses the moisture-entrained air for heating it. The heated moisture-entrained air flows from the blower pump to the heat exchanger to supply heat to it. In one form of the invention, a second heat exchanger is provided to cool the material flowing to the outlet of the chamber for recovering heat therefrom for retention in the system. The air flowing from the second heat exchanger flows into a chamber containing the blower pump which heats by conduction the air flowing from the second heat exchanger, whereby the thus heated air is then introduced to the chamber for the fluid bed. Such systems are highly efficient in operation, since, amongst other things, the blower pump performs two operations simultaneously. Namely, the blower pump draws the moisture-entrained air from the pressurizable chamber, and it also heats the moisture-entrained air for preheating the material to be dried entering the pressurizable chamber. Also, with such systems, there is no combustion of materials for heating purposes, and thus pollutants are not introduced into the ambient air as a result of such combustion.

The above-mentioned and other objects and features of this invention and the manner of attaining them will become apparent, and the invention itself will be best understood, by reference to the following description of embodiments of the invention taken in conjunction with the accompanying drawings, wherein:

FIG. 1 is a partly schematic cross-sectional elevational view of a particulate drying system, which is constructed in accordance with the present invention;

FIG. 2 is a cross-sectional view of the inlet heat exchanger of the system of FIG. 1 taken substantially along the line 2—2 thereof;

FIG. 3 is a cross-sectional view of the inlet heat exchanger of the system of FIG. 1 taken substantially along the line 3—3 thereof;

FIG. 4 is a cross-sectional view of the inlet heat exchanger of the system of FIG. 1 taken substantially along the line 4—4 thereof; and FIG. 5 is a partly schematic cross-sectional elevational view of another particulate drying system, which is also constructed in accordance with the present invention.

Referring now to FIGS. 1, 2, 3 and 4 of the drawings, there is shown a particulate drying system 10, which is constructed in accordance with the present invention. The system 10 is used for removing entrained moisture from particulate material, such as sand and grains. The system 10 generally comprises a tank 12 having a pressurizable chamber 14, which includes an inlet chute 16 for guiding the moisture-entrained material to be dried to the interior of the chamber 14, and an outlet chute 18 through which flows the dried material. An inlet rotary air lock 20 is disposed at the entrance to the inlet chute 16 to permit the material to be dried to enter the pressurizable chamber 14 and to maintain the pressurized condition of the chamber. Similarly, an outlet rotary air lock 22 disposed at the outlet chute 18 permits the dried material to exit the chamber 14, while maintaining it in its pressurized state. Such rotary air locks may be purchased from General Resource Corp., 201 South Third Street, Hopkins, Minn. 55343.

A heat exchanger 24 preheats the material to be dried as it falls through the inlet chute 16 before entering the chamber 14 as hereinafter described in greater detail. A compressing device in the form of a blower pump 28 draws air through the material to be dried for removing the moisture therefrom and drawing it out of the chamber 14 via a large outlet 31. A series of carefully dimensioned small vents 33 in the bottom wall 34 of the tank 12 permit air to be drawn into the chamber 14 for drying the material before being drawn off by the blower 28. As the solid material enters the chamber 14, the entrapped moisture content thereof is vaporized by the fact that the chamber 14 is pressurized to a low pressure and the material had been previously preheated. The flow of air entering the vents 33 is carefully controlled so that it surrounds and lifts the particles, whereby the particles are effectively suspended in the flow of air therethrough. Thus, the material is fluidized and flows downwardly along the sloped or inclined bottom wall 34 to the outlet chute 18. Such fluid beds may be purchased from Roberts and Schaefer Company, 120 South Riverside Plaza, Chicago, Ill. 60606.

A control valve 35 regulates the flow of compressed moist air flowing through the heat exchanger 24 from the blower 28 so that a back pressure is developed on the blower 28 to enable it to compress the air flowing from the blower 28 to the heat exchanger 24 for heating purposes.

In use, the material to be dried is dropped into the inlet chute 16 through the rotary air lock 20. After leaving the rotary air lock 20, the material to be dried falls through the heat exchanger 24, which preheats the particulate material to be dried.

The preheated material then falls into the pressurized chamber 14 where it is fluidized by the air entering the small vents 33 and leaving the chamber 14 via the large outlet 31. When the heated material enters the pressurized chamber, the moisture entrained in the material becomes evaporated therefrom and is carried with the air flowing through the material to the large outlet 31. The blower 28 then compresses the moisture-entrained air, whereby the compressed air is then heated as a result. The heated air is then conveyed to the heat exchanger 24 for preheating the material entering the chamber 14.

The cooled moist air flows from the heat exchanger 24 to the surrounding atmosphere through the control valve 35. The dry particulate material falls from the pressurized chamber 14 through the outlet rotary air lock 22. This operation is a continuous in-line operation.

Considering now the heat exchanger 24 in greater detail with particular reference to FIGS. 2, 3 and 4 of the drawings, the heat exchanger 24 has three stages. The lower coil stage 37 as shown in FIG. 4 of the drawings is disposed below an intermediate coil stage 39 which is shown in FIG. 3 of the drawings. An upper coil stage 41 is best seen in FIG. 2 of the drawings. Each one of the three coil stages is connected in series with one another so that the outlet of the blower 28 is connected through a conduit 43 to a bent coil section 44 and from there to a conduit 45 and to a bent coil 46 of the intermediate coil stage 39. A sight glass 47 is connected in fluid communication with the conduit 45 to enable the user to view any condensed moisture collecting in the heat exchanger 24. A shut-off valve 49 is connected in fluid communication with the sight glass 47 to enable the user to periodically drain the condensed moisture from the heat exchanger 24 to a drain pipe 52.

A conduit 54 connects the lower coil stage 37 in fluid communication with the bent coil 46 of the intermediate coil stage 39. A conduit 56 connects in fluid communication the intermediate coil stage 39 and a bent coil 57 of the upper coil stage 41. A conduit 58 connects in fluid communication the bent coil 57 with a vent pipe 62 through the control valve 35.

The three coil stages of the heat exchanger 24 are arranged such that the coils are disposed in a vertically spaced-apart manner and are interconnected in fluid communication in series with one another. Each one of the coils, such as the coil 37, is in the form of a series of reversely bent tubing sections arranged in a common plane. The planes of the coils are disposed in a parallel spaced-apart manner. The sections extend in longitudinal directions within their planes, and adjacent longitudinal directions of the planes are angularly displaced relative to one another so that the particulate material to be dried falling through the inlet chute has maximum exposure to the coil stages.

Referring now to FIG. 5 of the drawings, there is shown another particulate drying system 64, which is also constructed in accordance with the present invention, and which is similar to the system 10 except that the system 64 includes an arrangement for retaining the heat in the system and includes a technique for preheating the air entering the chamber. The system 64 includes a tank 66 which has a pressurizable chamber 68 which is similar to the chamber 14. An inlet chute 71 is connected in fluid communication with the chamber 68 to permit the particulate material to be dried to enter the chamber 68. An outlet chute 72 at the bottom portion of the chamber 68 permits the dried material to exit the chamber 68. An inlet rotary air lock 73 is disposed within the inlet chute 71 to serve the same purpose as the inlet air lock 20 of the system 10. Similarly, an outlet rotary air lock 75 is disposed in the outlet chute 72 to serve the same purpose as the air lock 22 of the system 10.

An inlet heat exchanger 77 is disposed within the inlet chute 71 and serves the same purpose as the heat exchanger 24 of the system 10. A pair of tandem blower pumps 81 and 83 serve the same purpose as the blower 28 of the system 10, and in the case of the system 64, the blower pumps 81 and 83 transfer the air from the pressurized chamber 68 to the inlet heat exchanger 77. The blower pumps 81 and 83 are each similar to one another and are connected in tandem. The blower pumps may be purchased from Rotron, Inc. of Woodstock, N.Y., and they are sold under the trade name CYCLONAIR DR regenerative blower pumps. A large outlet 85 of the chamber 68 permits the air to be drawn out of the pressurized chamber 68, and a series of small vent openings 87, which are similar to the small vents 33 in the system 10, permit air to enter the pressurized chamber 68 to fluidize the particles to be dried in a similar manner as the particles are fluidized in the system 10. An inclined bottom wall 89 in which the small vent openings 87 are disposed is inclined from the inlet chute 71 to the outlet chute 72 so that the material to be dried falls under the force of gravity through the tank 68 in a similar manner as the particles fall through the chamber 14 of the system 10.

An outlet heat exchanger 91 disposed in the outlet chute 72 recovers the heat from the dried particulate material falling into the outlet chute 72 for retaining the heat in the system and for cooling the dried particulte material. The outlet heat exchanger 91 includes a series of transverse tubes 93 connected at their inlet ends to an air inlet 95 into which air is drawn by the blower pumps 81 and 83. An expansion valve passage 97 connects the air inlet 95 in fluid communication with the inlets to the heat exchanger tubes 93 so that as the air is being drawn into the inlet 95, it expands rapidly to cool it. As a result, cool air passes through the transverse tubes 93 for cooling them. The cool tubes 93 in turn cool the dried particulate material, and the heat from the dried particulate material is transferred back to the air passing through the tubes 93 and enters a pressurizable chamber 99 in which the blower pumps 81 and 83 are disposed. The upper wall of the chamber 99 is the sloping bottom wall 89 of the chamber 68. As a result, as the warm air exits the tubes 93, it is heated still further by conduction when coming into contact with the blower pumps 81 and 83. The heated air passing over the blower pumps is then drawn into the chamber 68 through the small vent openings 87. As a result, the air entering the chamber 68 to fluidize the particles to be dried transfers heat to the particles to help evaporate the water entrained therein. Thus, the system 64 utilizes the air flowing from the outlet heat exchanger 91 to cool the blower pumps 81 and 83 and thus heat the air entering the chamber 68 to help the evaporation process of the particles which have already been preheated by the inlet heat exchanger 77. The system 64 is therefore a highly efficient system.

A conduit 101 connects the large outlet 85 in fluid communication with the inlet to a cyclone separator 103 which separates any particles which may have been entrained in the air being drawn out of the chamber 68. These particles can then be readily removed from the cyclone separator 103 by an outlet (not shown). A conduit 105 connects the air outlet of the cyclone separator 103 to the inlet of the pump 81, the conduit 105 entering through an opening in the chamber 99 and being sealed in place. A conduit 107 connects the outlet of the blower pump 81 to the inlet of the blower pump 83. A conduit 109 connects the outlet of the blower pump 83 in fluid communication with the inlet heat exchanger 77. The conduit 109 extends through an opening in the wall of the chamber 99 and is sealed in place. Similarly, the conduit 109 extends through an opening in the wall of the inlet chute 71 and is sealed thereto.

A control valve 112 is connected in fluid communication with the outlet of the inlet heat exchanger 77 to perform the same function as the control valve 35 to provide a back pressure for the blower pumps 81 and 83 to heat the moist air being pumped to the heat exchanger 77. As a result, the heat exchanger 77 preheats the material falling through the inlet chamber 71. A vent pipe 114 is connected in fluid communication with the control valve 112 to permit the air flowing from the heat exchanger 77 to escape to the atmosphere.

A sight glass 116 and a shut-off valve 118 are connected to the inlet heat exchanger 77 to serve the same purpose as the sight glass 47 and the shut-off valve 49 of the system 10 to remove condensed water from the heat exchanger 77 via a drain pipe 120.

In use, the particulate material to be dried falls into the inlet chute 71 through the air lock 73. The material to be dried then falls through the inlet heat exchanger 77 for preheating it. The preheated material then falls into the interior of the chamber 68 where it is fluidized by preheated air flowing through the vent openings 87 into the chamber 68 and out the outlet 85. The heated material being fluidized in the pressurized chamber 68 has its moisture evaporated therefrom in the process. The dried particulate material then falls along the inclined sloping bottom wall 89 from the inlet chute 71 to the outlet chute 72 and through the outlet heat exchanger 91, which cools the material. The cooled dried material then exits the outlet chute 72 via the air lock 75.

Air is drawn through the air inlet 95 and is cooled when it expands through the expansion passageway 97. The cool air then flows through the tubes 93 into the chamber 99 containing the blower pumps 81 and 83. It should be understood that the tubes 93 extend through the outlet chute 72 and have their ends disposed within holes in the walls of the chute 72, the tubes 93 being sealed in place thereto.

The air flowing out of the tubes 93 is then heated by the transfer of heat from the material falling through the outlet chamber 72. The warm air then flows over the blower pumps 81 and 83 to cool them and in turn to be heated still further. The thus heated air flows through the small vent openings 87 into the pressurized chamber 68 for fluidizing the particles falling therethrough. Moisture is then evaporated from the particles and becomes entrained in the air flowing through the chamber 68 up into the large vent opening 85.

The moisture-entrained air flowing from the large vent opening 85 via the conduit 101 into the cyclone separator 103 has any entrained particles removed therefrom by the separator 103. The air then flows from the separator 103 via the conduit 105 back to the inlet or suction side of the blower pump 81. From there, the outlet of the blower pump 81 is connected in tandem with the inlet to the blower pump 83. The air is then pumped from the blower pump 83 to the inlet heat exchanger 77 and through the control valve 112 to the vent pipe 114 to the atmosphere. The control valve 112 provides a back pressure for the blower pumps so that the air leaving the blower pumps is compressed and heated for supplying heat to the heat exchanger 77.

While particular embodiments of the present invention have been disclosed, it is to be understood that various different modifications are possible and are contemplated within the true spirit and scope of the appended claims. For example, the cyclone separator 103 of the system 64 may not be required in some applications as will become apparent to those skilled in the art. There is no intention, therefore, of limitations to the exact abstract or disclosure herein presented.

What is claimed is:

1. A system for drying moisture-entrained particulate material, comprising:
    means defining a pressurizable chamber for receiving the material to be dried, said chamber having an inlet and an outlet;
    inlet means for enabling the material to be dried to flow into said chamber via said inlet;
    outlet means for enabling the dryed material to flow out of said chamber via said outlet;
    fluid means disposed within said chamber for dispersing the material within said chamber between said inlet and said outlet;
    heat exchanging means for heating the material to be dried flowing into said chamber;
    compressing means for drawing air through said chamber to remove moisture from the material and for compressing the moisture-entrained air for heating it; and
    means for guiding the flow of heated moisture-entrained air from said compressing means to said heat exchanging means to supply heat to it.

2. A system according to claim 1, wherein said inlet means includes an inlet rotary air lock for permitting the material to be dried to enter said chamber and for enabling said chamber to remain pressurized, said outlet means including an outlet rotary air lock for permitting the dried material to exit said chamber and for enabling said chamber to be pressurized.

3. A system according to claim 1, wherein said fluid means includes a fluid bed disposed within said chamber and inclined from said inlet to said outlet, said fluid bed being means defining a plurality of predetermined dimensioned vent openings permitting air to enter said chamber.

4. A system according to claim 1, wherein said heat exchanging means includes at least one set of coils disposed in said inlet communicating with said chamber, said coil having one of its ends coupled in fluid communication with the outlet of said compressing means and having its other end coupled in fluid with the atmosphere.

5. A system according to claim 4, wherein said heat exchanging means further includes a plurality of other heat conducting coils, said coils being disposed in a vertically spaced-apart manner and interconnected in fluid communication.

6. A system according to claim 5, wherein each one of said coils is in the form of a series of reversely bent tubing sections arranged in a common plane, the planes of said coils being disposed in a parallel spaced apart vertical manner, said sections extending in a longitudinal direction within its plane, adjacent longitudinal directions of said planes being angularly disposed relative to one another.

7. A system according to claim 4, wherein said compressing means includes valve means coupling said other one of said ends of said coils to the atmosphere for controlling the back pressure of the fluid flowing through said coil.

8. A system according to claim 1, wherein said compressing means includes a blower pump.

9. A system according to claim 1, further including a second heat exchanging means for cooling the material entering said outlet, expansion means for cooling air being drawn into said second heat exchanger by said compressing means.

10. A system according to claim 9, further including a second chamber confining said compressing means, means for conveying warm air from said second heat exchanging means to enable said warm air to be heated still further by conduction from said compressing means disposed within said second chamber prior to entering the first-mentioned chamber.

* * * * *